Feb. 21, 1967   J. W. LEEGE   3,304,796
PLASTIC HUB AND INSERT ASSEMBLY FOR WHEELS AND SPROCKETS
Filed Aug. 27, 1964
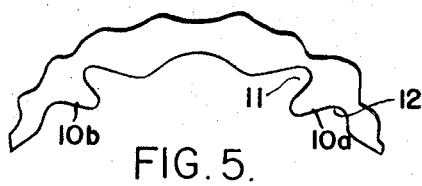
FIG. 5.
FIG. 1.
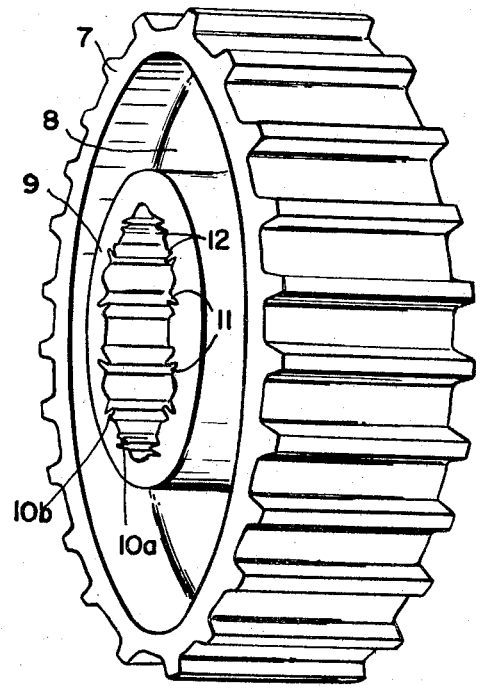
FIG. 2.
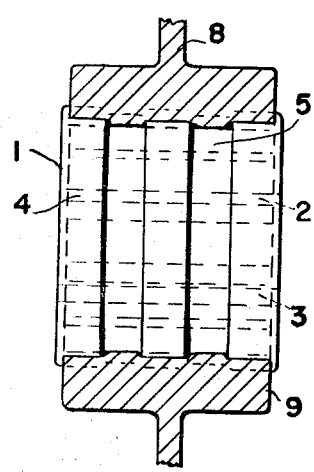
FIG. 4.
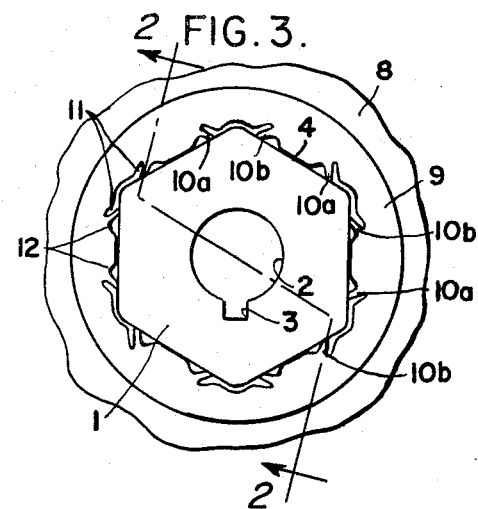
FIG. 3.

United States Patent Office 3,304,796
Patented Feb. 21, 1967

3,304,796
PLASTIC HUB AND INSERT ASSEMBLY FOR WHEELS AND SPROCKETS
James W. Leege, Greendale, Wis., assignor to Rex Chainbelt Inc., Milwaukee, Wis., a corporation of Wisconsin
Filed Aug. 27, 1964, Ser. No. 392,571
6 Claims. (Cl. 74—464)

This invention relates to the hub construction of sprockets or wheels and the like having separate inserts which are provided with the desired shaft sizes. The invention relates particularly to sprockets or wheels of molded construction and the securement of the inserts by press fitting.

The purpose of the separate inserts is to eliminate the boring of the sprockets or wheels to the desired shaft sizes and instead provide each sprocket or wheel of a given size with the desired shaft size merely by securing the insert having the desired shaft size in the hub of the sprocket. The cross-section of the insert should be non-circular so that it cannot turn in the hub; a regular polygon for symmetry and equalized stressing is universally preferred.

Securement by press fitting is accomplished by making the insert a given degree larger than the opening of the hub which receives the insert and then pressing the insert into the opening. The frictional engagement of the two parts as maintained by their elastic resilience normally provides the securement referred to.

However, the plastic materials available and suitable for molded sprockets or wheels necessarily and preferably have relatively low coefficients of friction and elasticity for the purposes of the sprocket or wheel. Also, control of the dimensional interference fit with due allowance for dimensional variations or manufacturing tolerances is generally insufficient to assure, for example, that an undersized hub can be pressed on an oversized insert without breakage and that in service an oversized hub will not be or become loose and/or shift on an undersized insert.

According to the present invention the insert is provided with a series of circumferential grooves and ribs, and the hub of the molded, plastic sprocket is internally provided with axial ribs which are angularly disposed respecting the sides of the insert which the ribs engage. After assembly, the plastic ribs of the sprocket under constant deflection develop a contour fitting that of the insert and provide a mechanical securement of the sprocket on the insert. The development of such a mechanical interlock is due to the cold flow or creep of the material under constant stress.

The object of the invention is to provide a more secure assembly of the insert in a plastic hub by press fitting.

Another object is to provide an interfitting of the hub and the insert which interfitting allows greater variation in their relative dimensions so that breakage of the plastic hub does not occur in press-fitting an oversize insert in an undersized hub and so that an adequately secure interlock is provided between an undersized insert in an oversized hub.

Another object is to allow a wider selection of plastic materials for the construction of the hub and sprocket or wheel as an integral unit to receive an insert having the selected bore size.

The drawings furnished herewith illustrate the best mode of carrying out the invention as presently contemplated and set forth hereinafter.

In the drawings:
FIGURE 1 is a perspective view of the insert;
FIG. 2 is a perspective view of the sprocket to receive the insert shown in FIGURE 1;
FIG. 3 is an end view of the hub of the sprocket with the insert assembled therein;
FIG. 4 is a side elevation of the insert shown in FIG. 3 with the hub of the sprocket broken away and sectioned to show the initial contour of the ribs of the hub engaging the insert; and
FIG. 5 is an enlarged end elevation of a portion of the sprocket hub showing in further detail the configuration of the ribs.

The insert 1 is provided with the axial bore 2 and may include the key-way 3 or other means for rotatably securing the insert on a shaft, not shown. Insert 1 is of a regular polygonal section, and it is believed that six sides, as shown, are generally most practical.

Insert 1 may be molded, cast and/or machined of plastic or metal to normal tolerances so that each side of insert 1 is provided circumferentially with the series of ribs 4 having flat surfaces or lands and the relatively shallow, intermediate grooves 5. The ribs 4 are approximately equally spaced, and preferably, the insert should include a rib 4 at each end thereof.

The sprocket 7 includes the central supporting web 8 and the hub 9 which as shown is of generally cylindrical outer dimensions.

The sprocket 7 shown in the drawings is approximately six inches in diameter and, as such, is readily molded with web 8 and hub 9 including ribs 10a and 10b. The opening in hub 9 to receive insert 1 is of a length and section generally corresponding to that of the insert except that the opening referred to is slightly larger than the cross-section of the insert taken through one of ribs 4 thereof. Each side of the hub defining the opening includes the spaced internally-projecting ribs 10a and 10b and grooves 11 and 12 which extend parallel to the axis of the sprocket and the length of the opening in the hub. Grooves 11 and 12 are directly alongside the respective ribs and of depths which give the ribs 10 the desired degree of yieldability to deflection as will be described.

Ribs 4 of insert 1 and ribs 10 of hub 9 are dimensioned so that they have an interference fit and ribs 10 of hub 9 engage ribs 4 of insert upon their assembly. Such assembly is accomplished merely by pushing the insert endwise into the opening of the hub until their ends are generally flush with each other. Upon such assembly the ribs 10 are deflected radially outwardly to the extent of such interference fit approximately as illustrated in FIG. 4.

The ends of ribs 10 are generally rounded to some degree so that the areas of contact or interengagement of the ribs 4 and 10 are relatively narrow areas extending across ribs 4. Such areas provide the entire radial support of the sprocket on the insert and shaft, not shown, and the equal deflection of ribs 10 is more than adequate to center the insert in the hub. Generally, two ribs 10 engaging each side of the insert are sufficient to support hub 9 on insert 1 and to transmit to the hub the torque applied to the insert. It is believed that each side of hub 9 defining the opening for the insert should preferably be provided with a rib 10a and a rib 10b which extend radially inwardly and angularly oppositely of or away from each other so that the rotational force of the insert in either direction is applied approximately endwise to all the ribs 10a or 10b of the hub. With such arrangement the deflection of the ribs due to the interference fit of the insert is generally unaffected by the torque applied to the sprocket.

According to the invention, the internal stresses due to the deflection of ribs 10 maintains the ribs 10 in such nterengagement under pressure so that during an initial number of hours after assembly, the pressure referred to effects an appreciable amount of cold flow of the material or ribs 10 generally in directions away from said areas of interengagement. Such cold flow or creep provides the equivalent of a series of indentations in which the ribs 4 are fitted and the portions of the ribs 10 intermediate ribs 4 provides a mechanical interlocking of the ribs and a positive securement of the sprocket 7 on insert 1. Such indentations are illustrated in FIG. 4.

In a set of inserts and sprockets of the approximate size described and shown and molded of a glass-filled propyethylene material a nominal interference of .026 inch would be typical. The actual interference, however, could be as little as .013 inch and as great as .031 inch. The material mentioned might be excellent for a sprocket to drive a chain in a food processing application, but as previously mentioned, the wide variation in interference has heretofore required measuring and matching of the hubs with the sprockets of the same size. Such matching is made unnecessary by the present invention wherein the yieldability of the ribs 10 accommodates the variations in dimensions of the hub and insert and provides their improved securement.

The effective interference is referred to for convenience and comparison purposes as the degree of force or "push-off load" necessary to push the insert out of the hub immediately after the initial "break-away" has occurred. As described, the insert and hub of the sprocket are in effect locked together by the ribs and specifically by the portions of the ribs 10 which are directly between the ribs 4. The interlocking parts do not absolutely prevent the sprocket from being pushed off from the hub, but substantially increase the push-off load even of the oversized sprocket which happens to be assembled on an undersized insert. Additionally, the undersized sprocket is not nearly as subject to failure by cracking open at the hub when assembled on an oversized insert. Also, the yieldability of the ribs 10 fully accommodates any shrinkage of the ends of the hub which may be encountered.

Accordingly, the greater flexibility in the fit of the hub on the sprocket allows a better selection of the materials of the hub and insert and a considerable improvement in the sprocket assembly is provided.

Various embodiments of the invention may be employed within the scope of the following claims wherein the term wheel is intended to include sprockets.

I claim:

1. The combination of a wheel including a hub of molded plastic construction and a separate insert for said hub having a central, axial bore for shaft mounting, said insert having a regular polygonal cross-section and relatively shallow, spaced circumferential grooves intermediate the ends thereof defining a series of spaced, radially projecting, circumferentially extending, flat ribs; said hub having inwardly facing sides defining an opening similar to the cross-section of said insert but slightly larger than said cross-section and including ribs formed integrally therewith and extending axially thereof, the ribs of each side of the hub projecting angularly inwardly of the opening and oppositely away from a plane intermediate the ribs and normal to the side of the hub, the several ribs of the hub being dimensioned such that they are deflected by said insert when the latter is pressed into the hub opening and the subsequent continued stressing effects the flow of the plastic material between the ribs of the hub to effect a positive mechanical securement of the hub on the insert.

2. A wheel assembly including a hub and an insert, said hub having symmetrical faces defining an opening to receive said insert, each of said faces having a number of ribs extending parallel to the hub corners defined by the intersection of said faces, said insert having symmetrical sides and a central bore of desired size for shaft mounting, each side of said insert having a number of spaced ribs perpendicular to the insert corners defined by the intersection of said sides, said ribs of the hub and insert being of a deformable plastic material and dimensioned to have an interference fit prior to pressing the insert into the opening of the hub and the spacing of the respective ribs of the hub and insert being sufficient to allow their plastic deformation in such assembly, the ribs of the hub and insert being respectively disposed at right angles with the spaced interfering portions in compressed interengagement causing plastic deformation and cold flow of material into the non-interfering portions to effect interlocking of the ribs of the hub with the ribs of the insert thus providing the improved securement of the hub on the insert with a given interference fit.

3. In a sprocket assembly including a hub and an insert, said hub having a polygonal opening therethrough corresponding to the polygonal cross-section of said insert which insert is provided with circumferential ribs and a central bore of desired size, the improvement in said assembly being a number of internally projecting ribs formed on the faces of said hub and extending parallel to the hub corners defined by the intersection of said faces, said ribs being inclined to the hub faces to lie approximately in a plane which is parallel to an adjacent face, each face of said hub having grooves on both sides of said ribs extending the length of the ribs and of depths such that a plane describing the throat area of said ribs is perpendicular to the line of direction of said ribs, said insert being dimensioned to fit within the hub opening with an equal interference fit among its several corresponding sides so that the interfering portions of the hub and insert are in compressed interengagement and the material in the non-interfering portions due to plastic deformation and cold flow being effective to provide an interlocking of said hub and insert.

4. The assembly in claim 3 wherein the insert has a number of relatively non-yielding circumferential ribs and the hub has yielding, axially extending ribs disposed to conform plastically with the configuration of said circumferential ribs and to provide the axial interlocking of the hub on the insert.

5. The improvement in an assembly for shaft mounting a hub having an opening therethrough and a separate insert within the hub opening and provided with an axial bore of desired shaft size, said insert and opening being of non-circular cross-section, said improvement comprising a number of flat, relatively non-yielding circumferential ribs formed integrally with said insert and a number of internally projecting, relatively yielding internally projecting ribs formed integrally with the hub and extending the length of the hub opening, the respective ribs of said hub and insert being dimensioned and overlying at right angles such that they have spaced interfering portions in compressed interengagement and non-interfering portions which project between the ribs of the hub, the material of the ribs of the hub being subject to cold flow and setting so that such non-interfering portions after such setting are in interlocked relation with the ribs of the insert and increase the force necessary to push the hub axially off of the insert.

6. The combination of a series of molded sprockets of selected sizes each having a hub part with an opening therethrough and a series of insert parts having bores therethrough of selected shaft sizes, each hub opening and insert part being of the same polygonal cross-section, said insert part having flat ribs extending circumferentially about the insert and projecting at least a given distance from the axis thereof, said hub part having narrow internally projecting ribs extending the length of the hub opening and projecting to within a given lesser distance from the axis of the sprocket than the insert ribs, said sprockets and insert parts being assembled and interchangeable by pushing the selected insert parts into and out of the hub openings of the selected sprockets, the ribs of the assembled sprockets and insert parts having interengaged intersecting portions and interlocking portions projecting between said intersecting portions, the mean degree of interengagement of said intersecting portions of the assembled series of sprockets and insert parts being characterized as their average interference and said interlocking portions providing the necessary additional securement of sprockets on the respective insert parts having interferences less than said average and the projection of said interlocking portions providing the necessary relief of stresses in the hubs having interferences greater than said average.

References Cited by the Examiner

UNITED STATES PATENTS

| | | | |
|---|---|---|---|
| 2,279,954 | 4/1942 | Sipe | 287—53 |
| 3,013,440 | 12/1961 | White | 74—443 X |
| 3,061,341 | 10/1962 | Grzych et al. | 287—53 |

DAVID J. WILLIAMOWSKY, *Primary Examiner.*

C. J. HUSAR, *Assistant Examiner.*